US011685535B2

(12) United States Patent
Volny et al.

(10) Patent No.: US 11,685,535 B2
(45) Date of Patent: *Jun. 27, 2023

(54) MULTI-STAGED SUSPENSION LINE ATTENUATOR

(71) Applicant: AMI Industries, Inc., Colorado Springs, CO (US)

(72) Inventors: Jaro S. Volny, Scottsdale, AZ (US); Bradley Mastrolia, Colorado Springs, CO (US); Kassidy L Carson, Colorado Springs, CO (US); Scott Seeber, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/321,165

(22) Filed: May 14, 2021

(65) Prior Publication Data

US 2021/0269165 A1 Sep. 2, 2021

Related U.S. Application Data

(62) Division of application No. 16/193,869, filed on Nov. 16, 2018, now Pat. No. 11,040,778.

(51) Int. Cl.
   *B64D 17/76* (2006.01)
   *B64D 17/26* (2006.01)
   *B64D 17/38* (2006.01)

(52) U.S. Cl.
   CPC ............. *B64D 17/76* (2013.01); *B64D 17/26* (2013.01); *B64D 17/386* (2013.01)

(58) Field of Classification Search
   CPC ...... B64D 17/26; B64D 17/386; B64D 17/76; B64D 17/74; B64D 17/00; B64D 17/24; B64D 17/22
   See application file for complete search history.

(56) References Cited

U.S. PATENT DOCUMENTS

| | | | | |
|---|---|---|---|---|
| 1,366,843 A | * | 1/1921 | Smith | B64D 17/00 244/145 |
| 1,649,934 A | * | 11/1927 | Thornblad | B64D 17/00 244/142 |
| 2,112,061 A | * | 3/1938 | Avorio | B64D 17/00 244/145 |
| 2,352,871 A | * | 7/1944 | Vernon | B64D 17/36 244/142 |

(Continued)

OTHER PUBLICATIONS

USPTO, Notice of Allowance dated Feb. 22, 2021 in U.S. Appl. No. 16/193,869.

(Continued)

*Primary Examiner* — Medhat Badawi
(74) *Attorney, Agent, or Firm* — Snell & Wilmer L.L.P.

(57) ABSTRACT

A multi-staged suspension line length parachute may include a suspension line having a primary length and a secondary length. The primary length may be deployable upon a first deployment of the multi-staged suspension line length parachute. The secondary length may be prevented from deployment until the primary length has fully deployed. An attenuator may attach a first portion of the secondary length to a second portion of the secondary length.

9 Claims, 9 Drawing Sheets

(56) References Cited

U.S. PATENT DOCUMENTS

| | | | | |
|---|---|---|---|---|
| 2,379,758 A * | 7/1945 | Smith | B64D 17/02 | 244/145 |
| 2,419,829 A * | 4/1947 | Fraim | B64D 17/02 | 28/143 |
| 2,520,931 A * | 9/1950 | Heinrich | B64D 17/36 | 244/152 |
| 2,526,264 A * | 10/1950 | Neff | D04B 21/08 | 66/193 |
| 2,736,524 A * | 2/1956 | Thebault | D06M 16/00 | 244/152 |
| 2,762,589 A * | 9/1956 | Frieder | B64D 17/52 | 244/148 |
| 2,843,933 A * | 7/1958 | Richards | B64D 17/386 | 30/182 |
| 2,949,263 A * | 8/1960 | Steinthal | B64D 17/64 | 244/113 |
| 2,954,191 A * | 9/1960 | Moran | B64D 17/34 | 244/145 |
| 2,998,950 A * | 9/1961 | Fritz | B64D 17/52 | 244/148 |
| 3,278,142 A * | 10/1966 | Marshall | B64D 17/64 | 244/149 |
| 3,348,793 A * | 10/1967 | Kriesel | B64D 17/52 | 244/152 |
| 3,602,462 A * | 8/1971 | Slater | B64D 17/00 | 244/145 |
| 3,804,698 A * | 4/1974 | Kinloch | B60R 22/28 | 428/176 |
| 3,887,151 A * | 6/1975 | Matsuo | B64D 17/346 | 244/152 |
| 3,937,407 A * | 2/1976 | Matsuo | A62B 35/04 | 280/805 |
| 3,940,095 A * | 2/1976 | Asciutto | B64D 17/40 | 244/148 |
| 3,989,207 A * | 11/1976 | Mader | B64D 17/34 | 244/152 |
| 4,022,406 A * | 5/1977 | Matsuo | B64D 17/34 | 244/152 |
| 4,137,352 A * | 1/1979 | Stonebridge | B29C 66/4322 | 112/440 |
| 4,513,931 A * | 4/1985 | Kenzie | B64D 17/386 | 244/152 |
| 4,693,436 A * | 9/1987 | Gold | B64D 17/76 | 244/149 |
| 5,232,184 A * | 8/1993 | Reuter | B64D 17/64 | 244/148 |
| 5,330,133 A * | 7/1994 | Rasmussen | B31F 1/07 | 244/145 |
| 5,433,290 A * | 7/1995 | Ellis | A62B 35/04 | 188/371 |
| 5,472,155 A * | 12/1995 | Mastrolia | B64D 17/24 | 87/8 |
| 5,648,623 A * | 7/1997 | Silverstein | G10D 9/02 | 84/383 R |
| 5,893,536 A * | 4/1999 | Lee | B64D 17/025 | 244/152 |
| 6,086,019 A * | 7/2000 | Ciuffi | B64D 17/62 | 244/149 |
| 6,220,547 B1 * | 4/2001 | Smith | B64D 17/025 | 244/152 |
| 6,301,753 B1 * | 10/2001 | Karg | F16G 11/046 | 24/132 R |
| 6,382,564 B1 * | 5/2002 | Sego, Jr. | B64D 17/40 | 244/151 R |
| 7,195,205 B1 * | 3/2007 | Lee | B64D 17/343 | 244/142 |
| 7,648,105 B2 * | 1/2010 | Dunker | B64C 39/024 | 244/152 |
| 8,640,993 B2 * | 2/2014 | Culbreath | A63B 43/007 | 446/49 |
| 8,985,520 B1 * | 3/2015 | Sadeck | B64D 17/14 | 244/145 |
| 9,067,666 B1 * | 6/2015 | Roach | B64B 1/42 | |
| 9,212,520 B1 * | 12/2015 | Hennings | B64D 17/02 | |
| 9,981,749 B1 * | 5/2018 | Swan | B64D 17/24 | |
| 10,053,221 B2 * | 8/2018 | Mastrolia | B64D 17/58 | |
| 11,040,778 B2 * | 6/2021 | Volny | B64D 17/26 | |
| 2012/0168565 A1 * | 7/2012 | Berland | B64D 17/025 | 244/152 |
| 2015/0377598 A1 * | 12/2015 | Runck | F42B 4/28 | 102/348 |
| 2016/0052635 A1 * | 2/2016 | Miki | B64D 17/24 | 244/145 |
| 2017/0233086 A1 * | 8/2017 | Homan | B64C 13/18 | 244/139 |
| 2017/0253339 A1 * | 9/2017 | Berland | B64D 17/025 | |
| 2017/0327236 A1 * | 11/2017 | Mastrolia | B64D 17/58 | |
| 2019/0092482 A1 * | 3/2019 | Volny | B64D 25/14 | |
| 2020/0156797 A1 * | 5/2020 | Volny | B64D 17/26 | |
| 2020/0223551 A1 * | 7/2020 | Volny | B64D 17/26 | |
| 2020/0262569 A1 * | 8/2020 | Volny | B64D 17/22 | |
| 2021/0269165 A1 * | 9/2021 | Volny | B64D 17/76 | |

OTHER PUBLICATIONS

USPTO, Supplemental Notice of Allowance dated May 3, 2021 in U.S. Appl. No. 16/193,869.

* cited by examiner

FIG. 6

MULTI-STAGED SUSPENSION LINE ATTENUATOR

CROSS-REFERENCE TO RELATED APPLICATIONS

This application is a divisional of, and claims priority to and the benefit of, U.S. application Ser. No. 16/193,869, filed Nov. 16, 2018 and entitled "MULTI-STAGED SUSPENSION LINE ATTENUATOR," which is incorporated by reference herein in its entirety for all purposes.

FIELD

The present disclosure relates to parachutes, and more specifically, to multi-staged suspension line length parachutes having a multi-staged suspension line attenuator.

BACKGROUND

Drogue parachutes may be used in ejections to slow and stabilize the object (e.g., ejection seat) and/or person before the main canopy deploys. Drogue parachutes typically comprise a canopy, risers, and suspension lines. The canopy may increase drag, the suspension lines may connect the canopy to the risers, and the risers may attach the parachute to the person and/or object (e.g., ejection seat) being ejected. Drogue parachutes may be configured for staged deployment. For example, at a first deployment stage, the drogue parachute deploys to a first length and at a second deployment stage, additional suspension line length is released and the drogue parachute deploys to a second, longer length. Release of the additional suspension line length tends to create a "lull," or reduction, in deceleration force followed by a rapid increase, or "spike," in force exerted on the object attached to the risers. The rate of change in force during the spike can lead to injury and/or other damage to the object.

SUMMARY

A multi-staged suspension line length parachute is disclosed herein. In accordance with various embodiments, the multi-staged suspension line length parachute may comprise a suspension line comprising a primary length and a secondary length. The secondary length may be folded to form an apex. A first portion of the secondary length may extend from a first end of the secondary length to the apex of the secondary length. A second portion of the secondary length may be located adjacent the first portion and may extend from the apex of the secondary length to a second end of the secondary length. An attenuator may couple the first portion of the secondary length to the second portion of the secondary length. A bundling line may be coupled to the suspension line. The bundling line may be configured to secure the secondary length. A cutter may be configured to sever the bundling line and release the secondary length. The attenuator may be configured to sequentially release the first portion of the secondary length from the second portion of the secondary length.

In various embodiments, a canopy may be coupled to the suspension line, and a bundling confluence may be coupled to the suspension line. The bundling confluence may comprise the cutter. In various embodiments, the first end of the secondary length may be located proximate a suspension loop, and the second end of the secondary length may be located proximate a confluence loop. In various embodiments, the bundling line may be located through the suspension loop and the confluence loop.

In various embodiments, a first section of the attenuator may comprise a first tensile strength, and a second section of the attenuator may comprise a second tensile strength greater than the first tensile strength. In various embodiments, the first section of the attenuator may be located closer to the apex of the secondary length as compared to the second section of the attenuator.

In various embodiments, the attenuator may comprise a plurality of stitches. A pitch of a first set of stitches of the plurality of stitches may be greater than a pitch of a second set of stitches of the plurality of stitches. The first set of stitches may be located in the first section of the attenuator, and the second set of stitches may be located in the second section of the attenuator.

In various embodiments, the first section of the attenuator comprises a first adhesive material including the first tensile strength, and the second section of the attenuator comprises a second adhesive including the second tensile strength.

A parachute arrangement is also disclosed herein. In accordance with various embodiments, the parachute arrangement may comprise a suspension line attachable to a canopy. The suspension line may comprise a primary length being deployable upon a first deployment of the parachute arrangement, and a secondary length configured to be prevented from deployment until the primary length has fully deployed. An attenuator may be coupled between a first portion of the secondary length and a second portion of the secondary length. The attenuator may be configured to sequentially separate and release the first portion of the secondary length from the second portion of the secondary length.

In various embodiments, a bundling line may be configured to secure the secondary length. A cutter may be coupled to the bundling line and configured to sever the bundling line to release the secondary length. In various embodiments, the bundling line may be coupled to a first loop located proximate a first end of the secondary length and to a second loop located proximate a second end of the secondary length.

In various embodiments, a first section of the attenuator may comprise a first tensile strength, and a second section of the attenuator may comprise a second tensile strength greater than the first tensile strength. In various embodiments, the first section of the attenuator may be located closer to the first end of the secondary length as compared to the second section of the attenuator.

In various embodiments, the first section of the attenuator may comprise a plurality of first stitches formed having a first pitch, and the second section of the attenuator may comprise a plurality of second stitches formed having a second pitch less than the first pitch.

In various embodiments, the first section of the attenuator may comprise a plurality of first stitches and the second section of the attenuator may comprise a plurality of second stitches. A pattern of the first stitches may be different from a pattern of the second stitches.

In various embodiments, the first section of the attenuator may comprise a plurality of first stitches formed by a first thread and the second section of the attenuator may comprise a plurality of second stitches formed by a second thread. A tensile strength of the second thread may be greater than a tensile strength of the first thread. In various embodiments, the attenuator may comprise an adhesive.

A method of making a multi-staged suspension line length parachute is also disclosed herein. In accordance with various embodiments, the method may comprise the steps of folding a secondary length of a suspension line, attaching an attenuator between a first portion of the secondary length and a second portion of the secondary length, locating an end of a primary length of the suspension line proximate a bundling confluence, locating a bundling line through a first loop located between a first end of the secondary length and the bundling confluence, and locating the bundling line through a second loop located between a second end of the secondary length of the suspension line and the end of the primary length of the suspension line.

In various embodiments, the step of attaching the attenuator may comprise forming a first section of the attenuator comprising a first tensile strength and forming a second section of the attenuator comprising a second tensile strength.

In various embodiments, the step of attaching the attenuator may comprise forming a plurality of first stitches in a first section of the attenuator and forming a plurality of second stitches in a second section of the attenuator. The second section of the attenuator may be located closer to an apex of the secondary length as compared to the first section of the attenuator. In various embodiments, at least one of a pitch of the plurality of first stitches, a pattern of the plurality of first stitches, or a tensile strength of the plurality of first stitches may be different from a pitch of the plurality of second stitches, a pattern of the plurality of second stitches, or a tensile strength of the plurality of second stitches.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a multi-staged suspension line length parachute including a suspension line attenuator. The attenuator may be implemented into a secondary length of the suspension line, which is configured to be stowed during a first stage of deployment of the multi-staged suspension line length parachute. In various embodiments, attenuation may be achieved by folding the secondary length of the suspension line onto itself and tacking the folded suspension line such that a first portion of the secondary length is affixed to a second portion of the secondary length. In this regard, the attenuator may prevent the multi-staged suspension line length parachute 100 from lengthening until a tension in the suspension line exceeds a maximum tensile strength of the attenuator. The attenuator may reduce or eliminate a lull (or drop) in tensile force through the suspension lines immediately after release of the secondary length, thereby decreasing the rate of change in force exerted on the object supported by multi-staged suspension line length parachute.

Figure 1A:
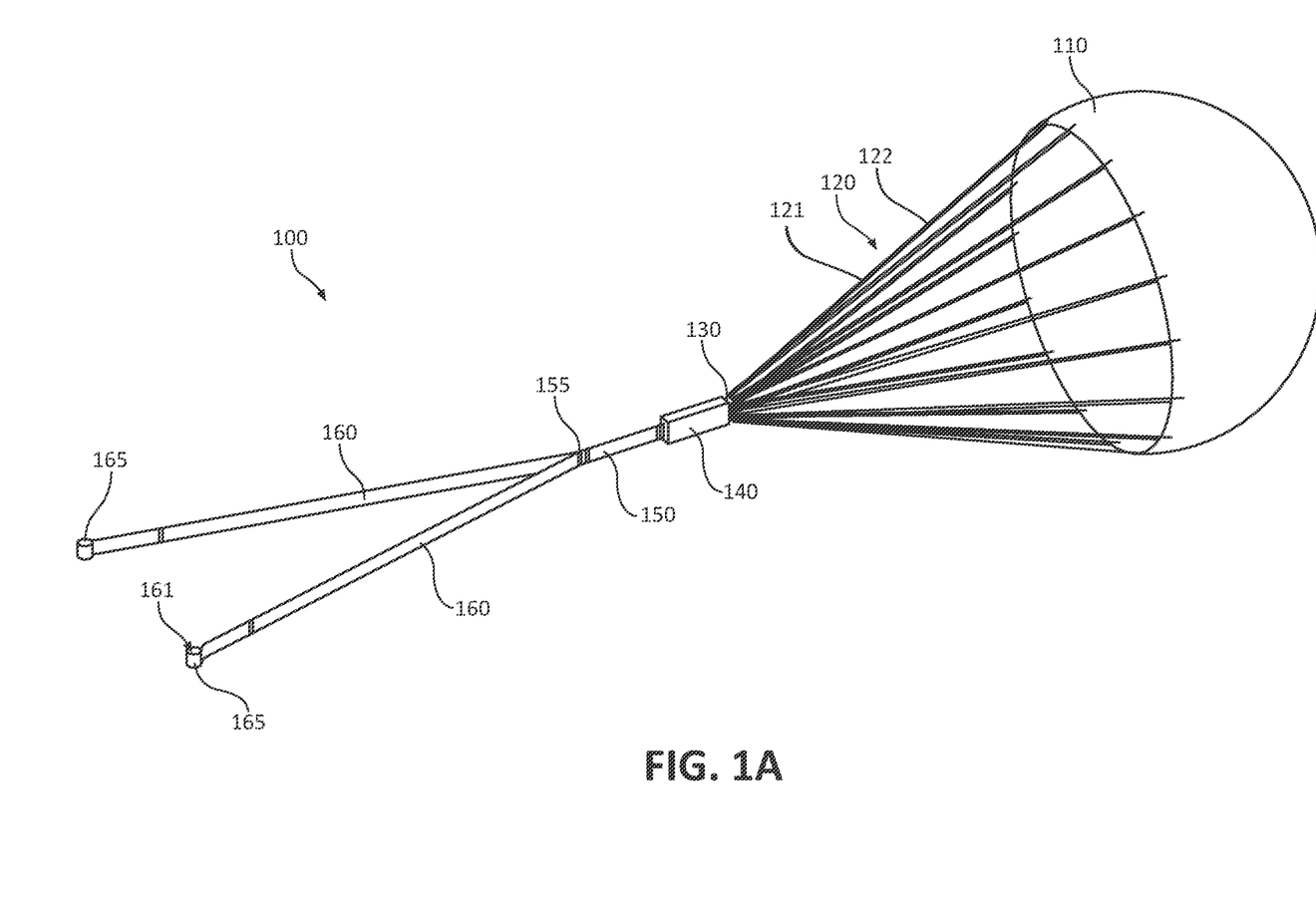
FIG. 1A illustrates a perspective view of a multi-staged suspension line length parachute deployed to a first length, in accordance with various embodiments.
Figure 1B:
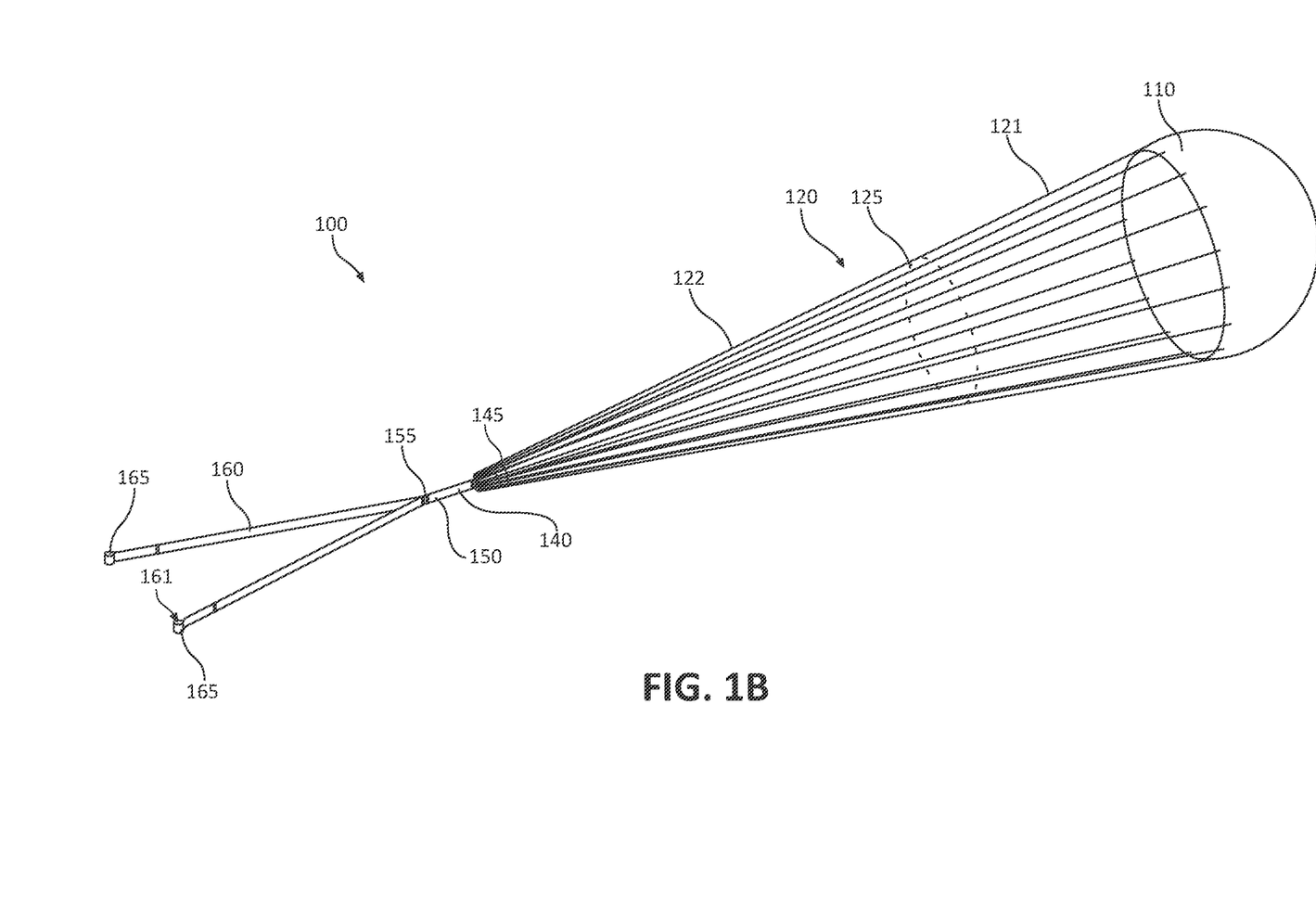
FIG. 1B illustrates a perspective view of a multi-staged suspension line length parachute deployed to a second length, in accordance with various embodiments.

With reference to FIGS. 1A and 1B, a multi-staged suspension line length parachute 100 is illustrated deployed to a first length (FIG. 1A) and to a second, longer length (FIG. 1B). Multi-staged suspension line length parachute 100 may comprise a canopy 110, suspension lines 120, a bundle 130, a bundling confluence 140, a confluence 150, and risers 160. Multi-staged suspension line length parachute 100 may be used to increase an object's, article's, person's, and/or the like's (collectively, "object") drag in response to the object being dropped, jumped, ditched, and/or ejected (collectively, "dropped") from an aircraft.

Upon deployment of multi-staged suspension line length parachute 100, canopy 110 may deploy to increase drag, or otherwise decelerate, the object. Canopy 110 may comprise any suitable type of canopy and any suitable type of material, such as, for example, canvas, silk, nylon, aramid fiber (e.g., KEVLAR®), polyethylene terephthalate, and/or the like. In various embodiments, suspension lines 120 may be configured to connect canopy 110 to risers 160. Suspension lines 120 connect canopy 110 to risers 160 through confluence 150 and bundling confluence 140. Suspension lines 120 and/or risers 160 may comprise any suitable material. For example, suspension lines 120 and/or risers 160 may comprise a tubular braided material that constricts in diameter under tension, such as, for example, nylon, aramid fiber (e.g., KEVLAR®), and/or the like.

Multi-staged suspension line length parachute 100 may be configured to enable multi-staged deployment of suspension lines 120, wherein after deployment of suspension lines 120 to a first length, suspension lines 120 may release to a second, longer overall length. Multi-staged deployment of suspension lines 120 may allow multi-staged suspension line length parachute 100 to have a first deployment stage comprising the first length (as shown FIG. 1A) to provide clearance over aircraft obstacles (such as an aircraft tail), and to have a second deployment stage comprising the second length (as shown in FIG. 1B) for added parachute stability. Deploying at the first length may reduce opening shock in multi-staged suspension line length parachute 100 while achieving an earlier suspension line stretch.

Suspension lines 120 may each comprise a primary length 121 and a secondary length 122. When multi-staged suspension line length parachute 100 is deployed to the first length, as shown in FIG. 1A, primary length 121 may extend from bundle 130 to canopy 110. In this regard, primary length 121 may comprise the portion of suspension line 120 that is deployed during the first deployment stage of multi-staged suspension line length parachute 100. Secondary length 122 may comprise a portion of suspension line 120 that is deployed during the second deployment stage of multi-staged suspension line length parachute 100. Stated differently, secondary length 122 comprises a portion of suspension line 120 that is stowed and does not experience a tensioning force during the first deployment stage of multi-staged suspension line length parachute 100. Suspension lines 120 may be coupled to canopy 110 using any suitable technique, such as, for example, through stitching, and/or through any other suitable method.

Confluence 150 may be configured to connect suspension lines 120 from bundling confluence 140 to risers 160. In various embodiments, confluence 150 may comprise an area of multi-staged suspension line length parachute 100 wherein suspension lines 120 are bound together. Suspension lines 120 may pass through bundling confluence 140 and may be bound together in confluence 150 via weaving, stitching, and/or through any other suitable method. In various embodiments, multi-staged suspension line length parachute 100 may comprise a greater number of suspension lines 120 as compared to the number of risers 160. Each riser 160 may be coupled to any number of suspension lines 120, such as, for example, 1 to 16 suspension lines 120 per riser 160, or 8 to 16 suspension lines 120 per riser 160. In various embodiments, each riser 160 may couple to 8 suspension lines 120. Confluence 150 may comprise a stitching area 155 that separates suspension lines 120 into risers 160. For example, where the number of suspension lines 120 is 16, and the number of risers 160 is 2, stitching area 155 may separate suspension lines 120 into two sets of 8 suspension lines 120 with each of the 2 risers 160 coupled to an individual set of 8 suspension lines 120.

Risers 160 may be configured to attach an object, such as an ejections seat, to multi-staged suspension line length parachute 100. In various embodiments, risers 160 may comprise an attachment location 165. Attachment location 165 may be on an end of risers 160 that is opposite of confluence 150. Attachment location 165 may comprise any suitable attachment mechanism for securing an object to multi-staged suspension line length parachute 100. In various embodiments, attachment location 165 may comprise a loop 161 created by riser 160 being bound to itself.

Figure 2A:
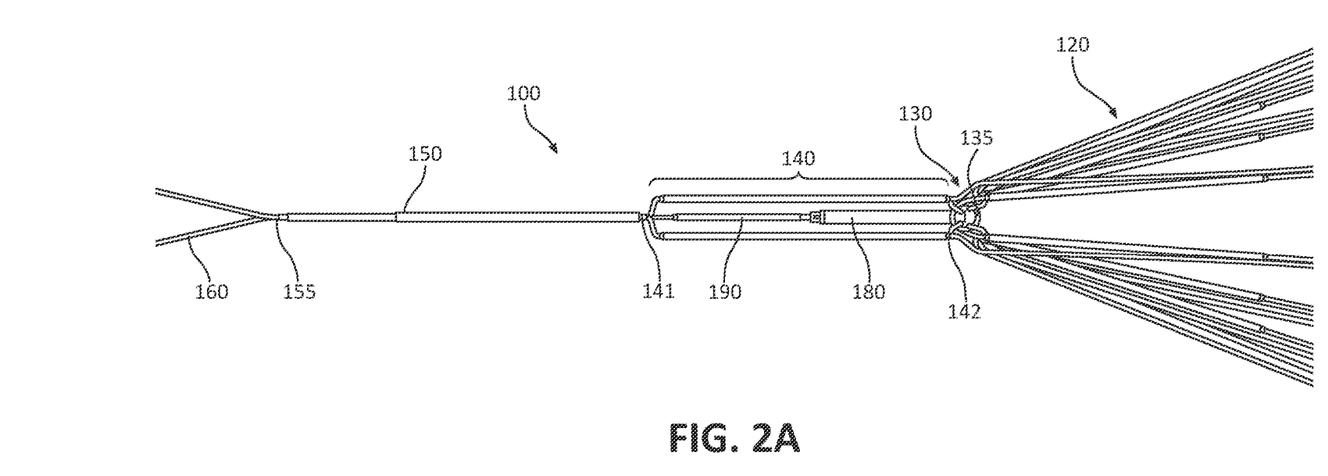
FIG. 2A illustrates a side view of a bundling confluence, in accordance with various embodiments.
Figure 2B:
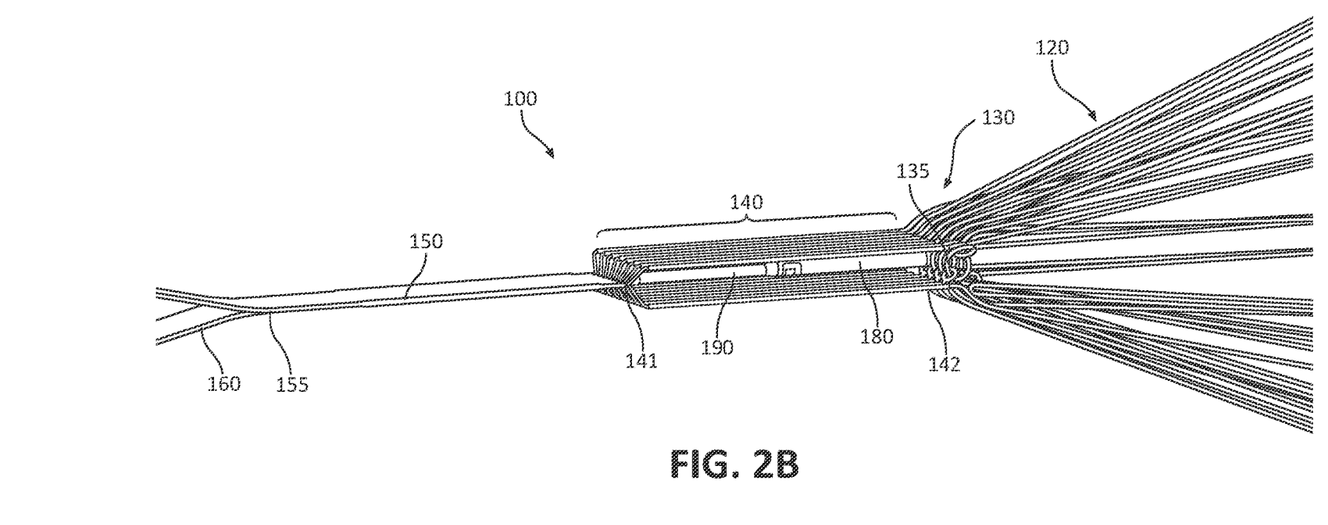
FIG. 2B illustrates a perspective side view of the bundling confluence of FIG. 2A, in accordance with various embodiments.
Figure 2C:
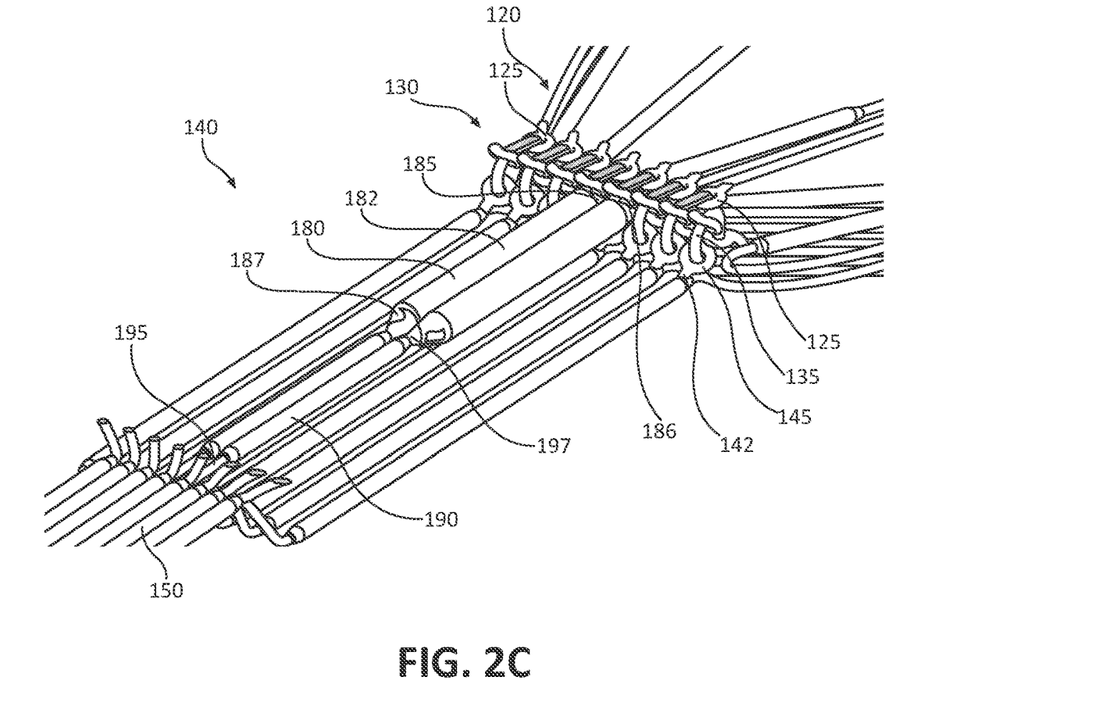
FIG. 2C illustrates a perspective view of a cutter in the bundling confluence of FIGS. 2A and 2B, in accordance with various embodiments.

With reference to FIGS. 2A, 2B, and 2C, bundling confluence 140 is depicted in greater detail, in accordance with various embodiments. Bundling confluence 140 may comprise a confluence (or first) end 141 and a suspension (or second) end 142. Confluence end 141 may be configured to connect bundling confluence 140 to confluence 150. In various embodiments, confluence end 141 may be configured to connect directly into risers 160. Suspension end 142 may be configured to connect bundling confluence 140 to bundle 130. Bundling confluence 140 may comprise any suitable number of cutter(s) 180 and matching cutter pin puller(s) 190. For example, as depicted in FIG. 2C, bundling confluence 140 comprises two cutters 180 and two corresponding cutter pin pullers 190 (e.g., for redundancy purposes).

Cutter 180 may be configured to sever a bundling line 135 of bundle 130, thereby releasing secondary length 122 of suspension line 120. In this regard, cutter 180 severing bundling line 135 may initiate the second deployment stage of multi-staged suspension line length parachute 100. Cutter 180 may comprise a pin end 187 and a head end 185 concealed within a cutter sleeve 182. Cutter sleeve 182 may comprise the same material as suspension lines 120 and risers 160, and/or any other suitable material, and may be configured to enclose components of cutter 180. Pin end 187 may be connected to a first end 197 of cutter pin puller 190. Cutter 180 includes a severing device (for example, a blade, hammer, striker, bolt, shape charge, or the like) configured to sever bundling line 135. The severing device may be located within cutter sleeve 182. Cutter pin puller 190 may be configured to pull pin end 187 of cutter 180 during and/or after the first deployment stage of multi-staged suspension line length parachute 100. For example, a second end 195 of cutter pin puller 190 may be connected to bundling confluence 140. Cutter pin puller 190 may pull pin end 187 in response to tension imparted by bundling confluence 140 during deployment. In various embodiments, cutter pin puller 190 may be coupled to suspension line 120 at second end 195, such that cutter pin puller 190 is configured to pull pin end 187 in response to tension imparted by suspension line 120. In response to pin end 187 being pulled, the severing device may translate towards head end 185 of cutter 180. In various embodiments, pulling pin end 187 may create an explosive charge, or may release a mechanical spring, configured to translate severing device towards head end 185 and bundling line 135. In that regard, bundling line 135 may pass through an aperture 186 of head end 185. The severing device may pass through aperture 186 to sever bundling line 135.

Figure 3:
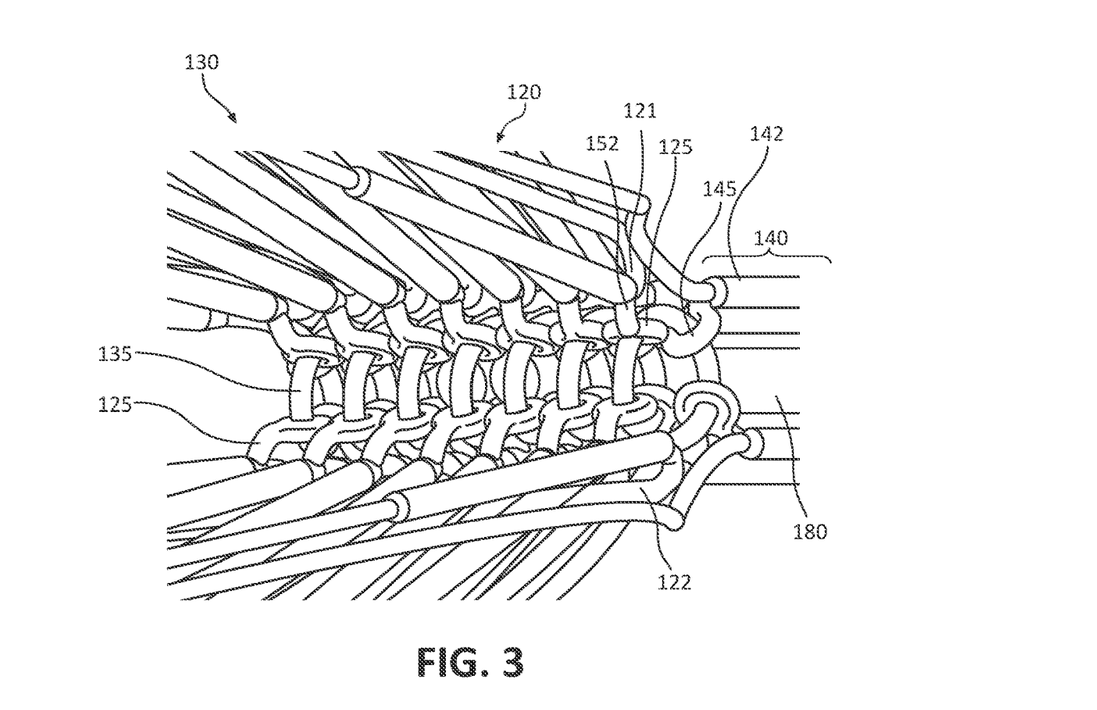
FIG. 3 illustrates a perspective view of a bundle, in accordance with various embodiments.

With reference to FIG. 3, bundle 130 is depicted in greater detail. In various embodiment, bundle 130 may be configured as a central point for securing and deploying secondary length 122 of suspension lines 120. Bundle 130 may comprise bundling line 135. Bundling line 135 may be configured to couple and/or secure a first end 152 of primary length 121 of suspension line 120 to suspension end 142 of bundling confluence 140. In various embodiments, multi-staged suspension line length parachute 100 may comprise confluence loops 145 configured to couple bundling confluence 140 to bundling line 135. Confluence loops 145 may be formed by, or otherwise attached to, suspension end 142 of bundling confluence 140. Multi-staged suspension line length parachute 100 may further comprise suspension loops 125 configured to couple primary length 121 to bundling line 135. Suspension loop 125 may be formed by, or otherwise attached to, first end 152 of each primary length 121. In various embodiments, bundling line 135 may be configured to pass through confluence loops 145 and suspension loops 125 to secure first end 152 of primary length 121 to bundle 130. In various embodiments, the configuration of bundling line 135 may comprise any suitable shape, size, and/or design suitable to route bundling line 135 through confluence loops 145 and suspension loops 125. For example, bundling line 135 may comprise a helical pattern, a zig-zag pattern, and/or any other suitable pattern. In response to bundling line 135 being severed by cutter 180, first end 152 of primary length 121 may translate away from bundling confluence 140. Prior to severing bundling line 135, bundle 130 may reduce or prevent tension from being imparted into the secondary lengths 122 of suspension lines 120. Upon bundling line 135 being severed (i.e., being uncoupled from suspension loops 125 and/or from confluence loops 145), tension may be applied to the secondary lengths 122.

Figure 4A:
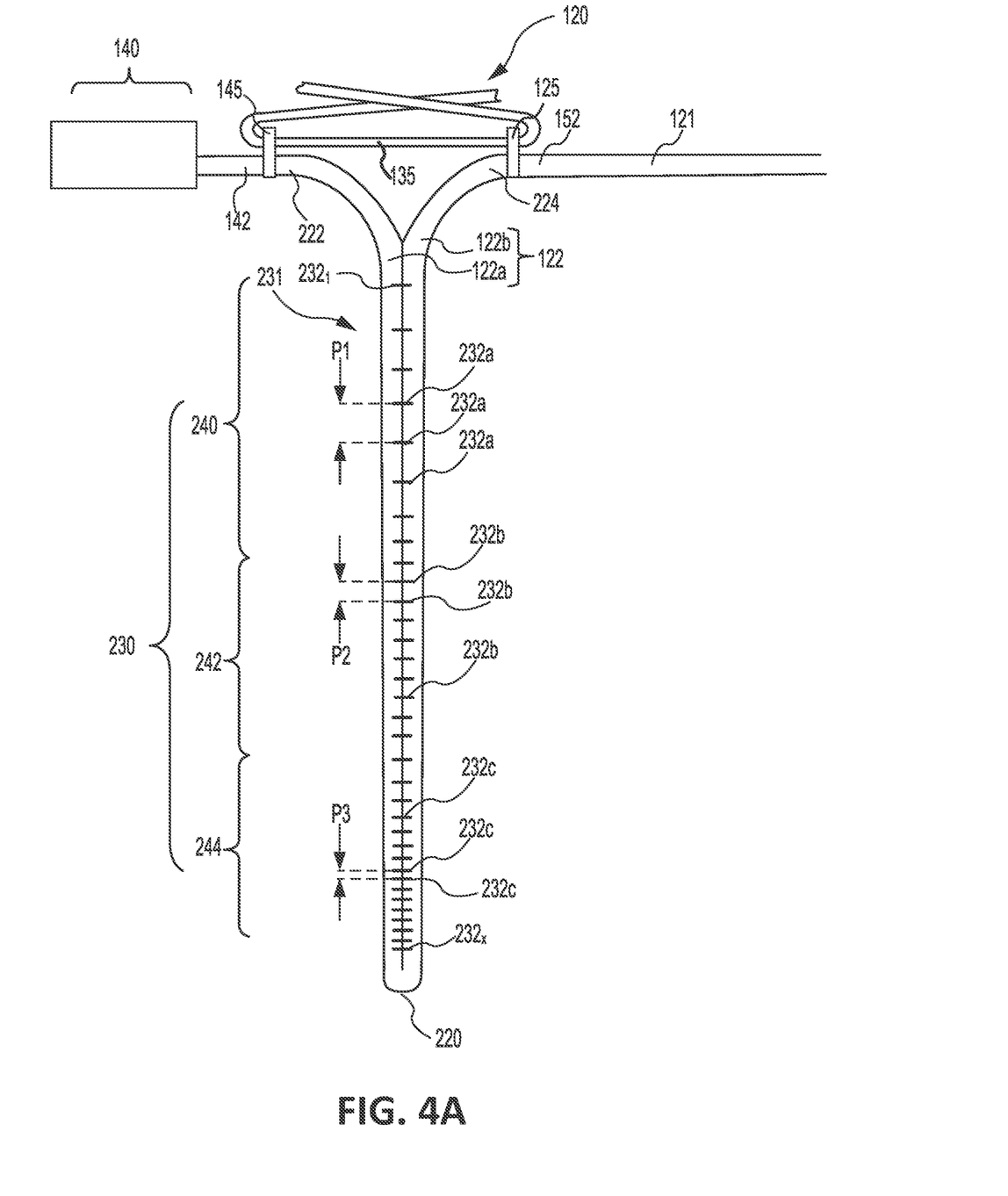
FIG. 4A illustrates a suspension line with an attenuator comprising a thread system attaching a first portion of a secondary length of the suspension line to a second portion of the secondary length, in accordance with various embodiments.

With reference to FIG. 4A, an actuator 230 attached to the secondary length 122 of a suspension line 120 is illustrated, in accordance with various embodiments. In various embodiments, secondary length 122 may be folded on itself such that a first portion 122a of secondary length 122 is adjacent to and/or contacting a second portion 122b of secondary length 122. Folded secondary length 122 may include an apex 220. In the folded state, first portion 122a of secondary length 122 extends from a first end 222 of secondary length 122 to apex 220, and second portion 122b of secondary length 122 extends from apex 220 to a second end 224 of secondary length 122. First end 222 of secondary length 122 is located proximate bundling confluence 140 and confluence loops 145. For example, one or more confluence loop(s) 145 may be formed, or otherwise attached, between first end 222 of secondary length 122 and suspension end 142 of bundling confluence 140. Second end 224 of secondary length 122 is located proximate primary length 121 and suspension loop 125. For example, one or more suspension loop(s) 125 may be formed, or otherwise attached, between second end 224 of secondary length 122 and first end 152 of primary length 121.

In accordance with various embodiments, multi-staged suspension line length parachute 100 may include attenuator 230. Attenuator 230 may be configured to tack, couple, or otherwise attach first portion 122a of secondary length 122 to second portion 122b of secondary length 122. In various embodiments, first portion 122a may be configured to de-attach from second portion 122b, in response to attenuator 230 breaking under tension. In that regard, bundling line 135 being coupled to loops 125 and 145 may prevent tension from being imparted to attenuator 230, thereby preventing breakage of the attenuator 230 until the second deployment stage. For example, and with brief reference to FIGS. 2C and 4A, in response to cutter 180 activating to sever bundling line 135, secondary length 122 may begin to release and apply tension to the attenuator 230. Attenuator 230 may break in response to the tension, thereby releasing first portion 122a of secondary length 122 from second portion 122b. Attenuator 230 may be configured to break under any suitable and/or desired amount of tension, dependent upon the type of multi-staged suspension line length parachute 100, weight and size of the object being carried, type of aircraft, and/or any other operational and/or conditional elements. Attenuator 230 may comprise any suitable material, for example thread, chords, wire, adhesive, etc., The material and/or configuration of attenuator 230 may be chosen based on the desired amount of tension associated with breaking the attenuator and releasing first portion 122a from second portion 122b.

In various embodiments, attenuator 230 may comprise a thread system 231 configured to unravel in response to a tensile force applied to secondary length 122. In the various embodiments, thread system 231 may be stitched in a manner such that, after bundling line 135 is severed, the tensile force imparted by first and second portions 122a, 122b onto thread system 31 may undo and/or break the stitches 232 of thread system 231. In this regard, first portion 122a may begin to decouple from second portion 122b in response to severing bundling line 135. Attenuator 230 is configured to sequentially separate such that a first stitch $232_1$ closest to first and second ends 222, 224 of secondary length 122 may be the first stitch to break upon severing of bundling line 135. After first stitch $232_1$ breaks, stitches 232 break sequentially in a direction extending from first stitch $232_1$ to a final stitch $232_x$. Final stitch $232_x$ is located proximate (i.e., closest to), apex 220 of secondary length 122. In this regard, final stitch $232_x$ may be last to break.

In various embodiments, the tensile strength of attenuator 230 may vary along secondary length 122. For example, a first section 240 of attenuator 230 may be configured to have a first tensile strength, and a second section 242 of attenuator 230 may be configured to have a tensile strength different from the tensile strength of first section 240. In various embodiments, the tensile strength in second section 242 may be greater than the tensile strength in first section 240. In various embodiments, a third section 244 of attenuator 230 may be configured to have a tensile strength that is different from the tensile strength of first section 240 and/or from the tensile strength of second section 242. In various embodiments, the tensile strength in third section 244 may be greater than the tensile strength in first section 240 and/or greater than the tensile strength in second section 242.

In various embodiments, first section 240 of attenuator 230 may comprise a plurality of first stitches 232a, second section 242 may comprise a plurality of second stitches 232b, and third section 244 may comprise a plurality of third stitches 232c. In various embodiments, a pitch P1 of first stitches 232a (i.e., a distance between adjacent stitches) is greater than a pitch P2 of second stitches 232b. In various embodiments, pitch P2 of second stitches 232b is greater than a pitch P3 of third stitches 232c. In various embodiments, a stitch pattern of the first stitches 232a may be different from the stitch pattern of second stitches 232b and/or from the stitch pattern of third stitches 232c. For example, first stitches 232a may be formed in, for example, a parallel stitch pattern, second stitches 232b may be formed in, for example, a zig-zag stitch pattern, and third stitches 232c may be formed in, for example, an overlapping or "X" pattern. In various embodiments, the thread used to form first stitches 232a, second stitches 232b, and/or third stitches 232c may be varied. For example a first thread comprising a first tensile strength may be used to from first stitches 232a, a second thread comprising a second tensile strength different from (e.g., greater than) the first tensile strength of the first thread may be used to form second stitches 232b, and a third thread comprising a third tensile strength different from (e.g., greater than) the second tensile strength of the second thread may be used to form third stitches 232c.

Figure 4B:
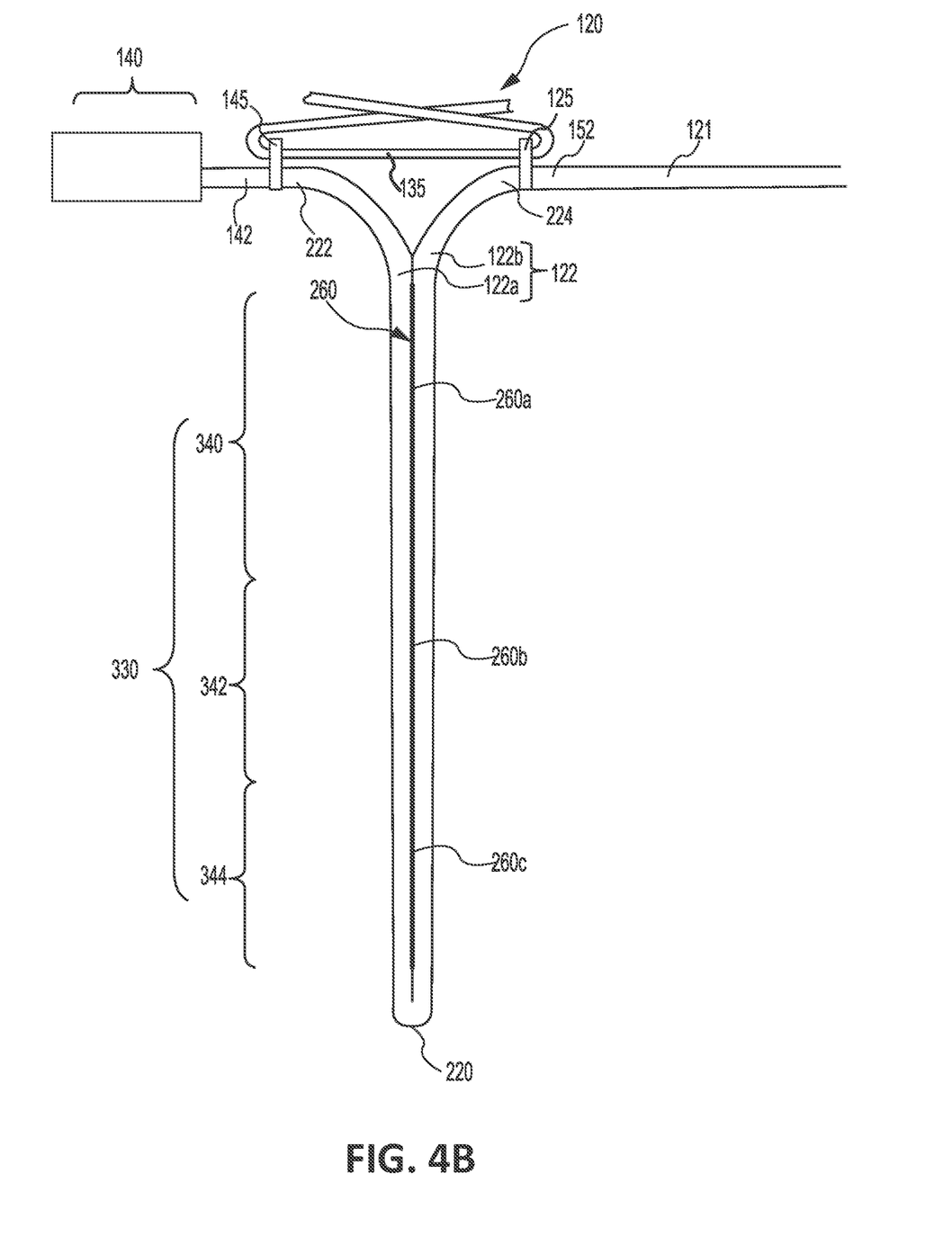
FIG. 4B illustrates a suspension line with an attenuator comprising an adhesive material attaching a first portion of a secondary length of the suspension line to a second portion of the secondary length, in accordance with various embodiments.

With reference to FIG. 4B, in various embodiments, secondary length 122 may include an attenuator 330 comprising an adhesive 260. The material of adhesive 260 may be varied along secondary length 122. For example, in various embodiments, a first section 340 of attenuator 330 may comprise a first adhesive material 260a, a second section 342 of attenuator 330 may comprise a second adhesive material 260b, and a third section 344 of attenuator 330 may comprise a third adhesive material 260c. In various embodiments, the tensile strength of second adhesive material 260b may be greater than the tensile strength of first adhesive material 260a. In various embodiments, the tensile strength of third adhesive material 260c may be greater than the tensile strength of second adhesive material 260b.

In various embodiments, secondary length 122 of suspension line 120 may also be stowed to prevent tangling of suspension line 120 prior to the first deployment stage (and/or to the second deployment stage) of multi-staged suspension line length parachute 100. In various embodiments, and with reference to FIG. 5A, secondary length 122 may be attached to canopy 110 at a location 415, and/or along primary length 121. In that regard, secondary length 122 may be attached to location 415, and/or primary length 121, using any suitable technique allowing secondary length 122 to de-attach and deploy during the second deployment stage of multi-staged suspension line length parachute 100. For example, secondary length 122 may be attached by tacking secondary length 122 to canopy 110. In this regard, secondary length 122 may be stowed parallel to primary length 121 of suspension line 120, and tacked to canopy 110 at location 415, and/or along primary length 121.

Figure 5A:
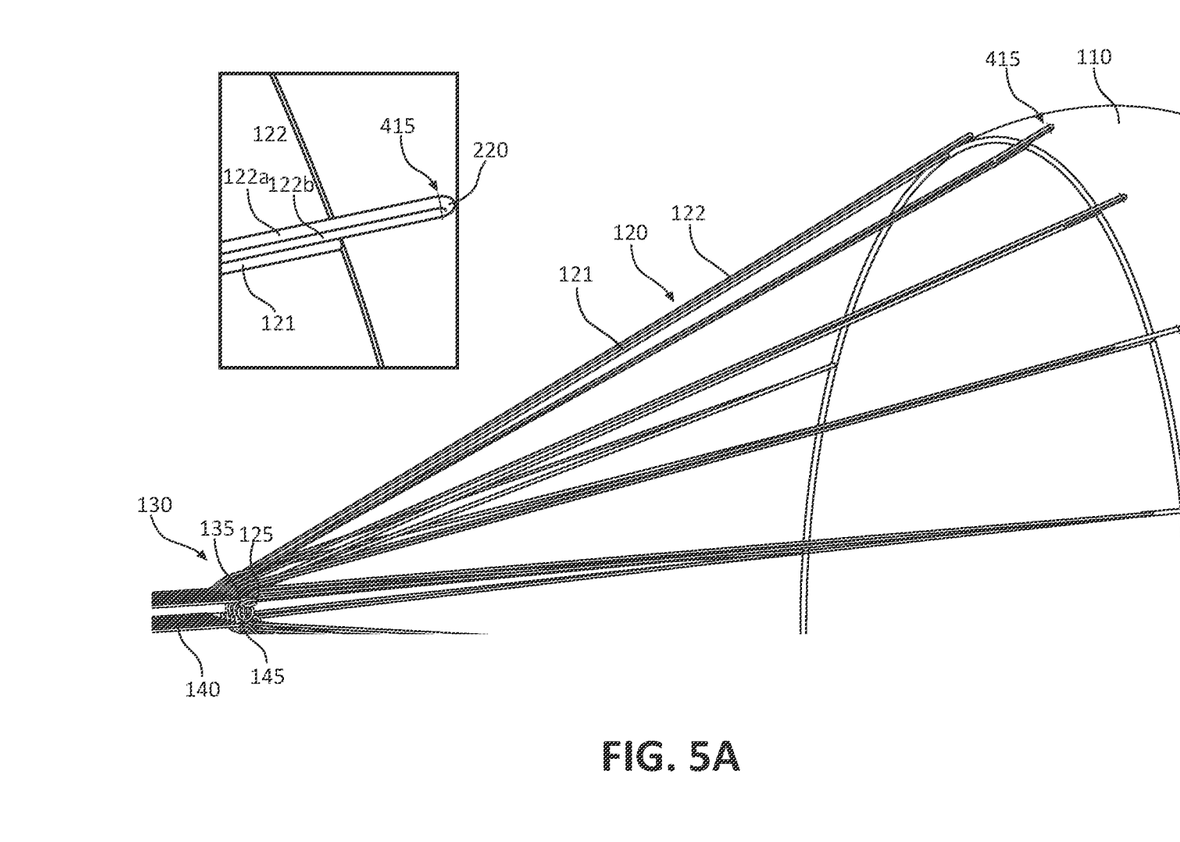
FIG. 5A illustrates a multi-staged suspension line length parachute having a secondary length of suspension line stowed parallel to the primary length and tacked to the canopy, in accordance with various embodiments.
Figure 5B:
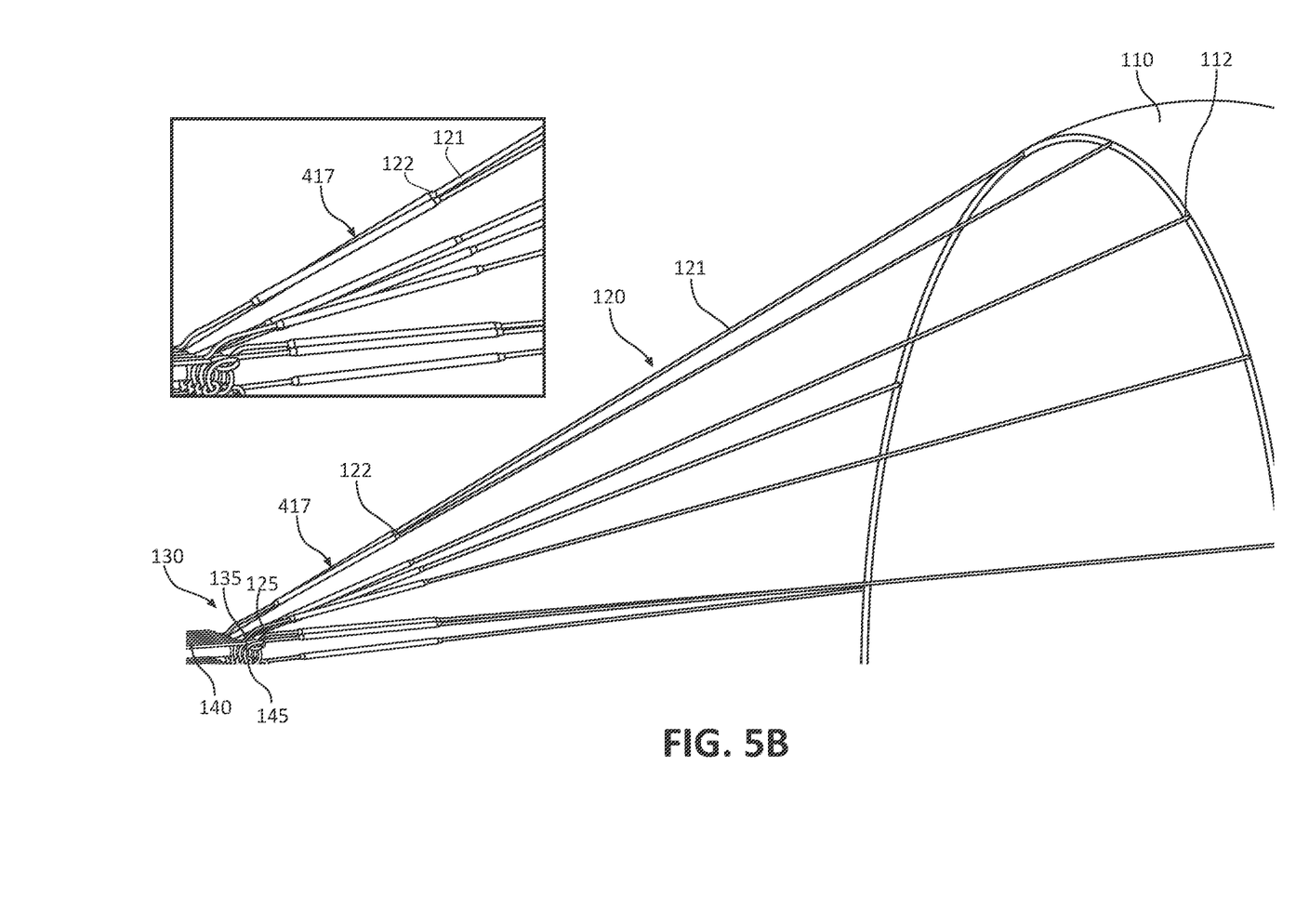
FIG. 5B illustrates a multi-staged suspension line length parachute having a secondary length of suspension line stowed in a sleeve parallel to the primary length, in accordance with various embodiments.

In various embodiments, secondary length 122 may be configured to detach from second location 415, and/or primary length 121, in response to the tacking breaking under tension. In that regard, prior to severing bundling line 135 tension may be prevented from being imparted to secondary length 122, thereby preventing breakage of the tacking until the secondary deployment of the parachute. The tacking may be configured to break under any suitable and/or desired amount of tension, dependent upon the type of multi-staged suspension line length parachute 100, weight and size of the object being carried, type of aircraft, and/or any other operational and/or conditional elements. Secondary length 122 may be tacked to second location 415, and/or along primary length 121, using any suitable material, knots, and/or cords dependent upon the amount of tension desired to break under.

In various embodiments, and with reference to FIG. 4B, secondary length 122 of suspension line 120 may be stowed in a sleeve 417. In that regard, secondary length 122 of suspension line 120 may be inserted into sleeve 417 to prevent entanglement of secondary length 122 of suspension line 120 prior to, and during, the first deployment stage (and/or second deployment stage) of multi-staged suspension line length parachute 100. In various embodiments, sleeve 417 may comprise a full-length continuous sleeve spanning from bundle 130 to canopy 110. In further embodiments, sleeve 417 may comprise any other suitable length capable of storing secondary length 122 of suspension line 120. Sleeve 417 may comprise a low friction material such that sleeve 417 may stow secondary length 122 of suspension line 120 before deployment and during the first deployment stage, but also allow secondary length 122 of suspension line 120 to release after the second deployment. Sleeve 417 may be coupled to suspension line 120, such as through stitching and/or the like. In various embodiments, secondary length 122 of suspension line 120 may also be stowed in a bundle, pouch, loop, or via any other suitable and/or desirable stowage method.

With reference to FIG. 1B, multi-staged suspension line length parachute 100 in the second deployment stage is depicted, in accordance with various embodiments. In response to cutter 180 (FIG. 2C) activating to sever bundling line 135, suspension bundling loops 125 may release from bundling line 135 to allow secondary length 122 of suspension line 120 to deploy. In this regard, suspension line 120 can deploy to the full length of primary length 121 and secondary length 122 to extend into a second length longer than the first length (i.e., the first length comprises primary length 121 of suspension line 120, whereas the second length comprise primary length 121 and secondary length 122 of suspension line 120).

Figure 6:
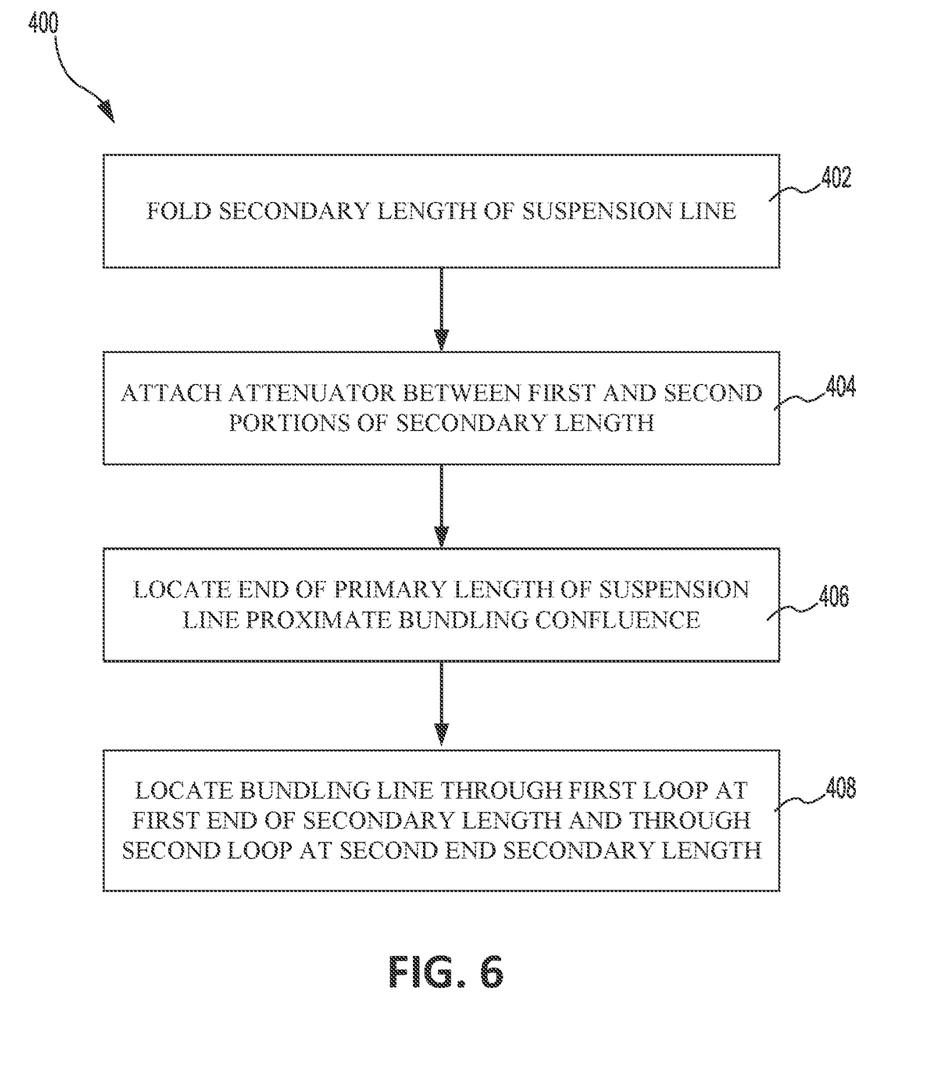
FIG. 6 illustrates a method for making a multi-staged suspension line length parachute, in accordance with various embodiments.

In accordance with various embodiments, and with reference to FIG. 6, a method 400 for making a multi-staged suspension line length parachute 100 is disclosed. Method 400 may comprise folding a secondary length of a suspension line (step 402) and attaching an attenuator between a first portion of the secondary length and a second portion of the secondary length (step 404). Method 400 may further include locating an end of a primary length of the suspension line proximate a bundling confluence (step 406) and locating a bundling line through a first loop located proximate a first end of the secondary length and through a second loop located proximate a second end of the secondary length (step 408). In various embodiments, the first loop may be located between the first end of the secondary length and the bundling confluence, and the second loop may be located between the second end of the secondary length and the end the primary length.

In various embodiments, step 404 may include forming a first section of the attenuator comprising a first tensile strength and forming a second section of the attenuator comprising a second tensile strength different from the first tensile strength. In various embodiments, the second section of the attenuator may be located closer to an apex of the secondary length as compared to the first section of the attenuator.

In various embodiments, step 404 may include forming a plurality of first stitches in a first section of the attenuator and forming a plurality of second stitches in a second section of the attenuator. In various embodiments, at least one of a pitch of the first stitches, a pattern of the first stitches, or a tensile strength of the first stitches is different from a pitch of the second stitches, a pattern of the second stitches, or a tensile strength of the second stitches.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute arrangement, comprising:
   a suspension line attachable to a canopy, the suspension line comprising:
      a primary length configured to deploy upon a first deployment of the parachute arrangement; and
      a secondary length prevented from deployment until the primary length has fully deployed; and
   an attenuator coupled between a first portion of the secondary length and a second portion of the secondary length, wherein the attenuator is configured to sequentially separate and release the first portion of the secondary length from the second portion of the secondary length.

2. The parachute arrangement of claim 1, further comprising:
   a bundling line configured to secure the secondary length; and
   a cutter coupled to the bundling line and configured to sever the bundling line to release the secondary length.

3. The parachute arrangement of claim 2, wherein the bundling line is coupled to a first loop located proximate a first end of the secondary length and to a second loop located proximate a second end of the secondary length.

4. The parachute arrangement of claim 1, wherein a first section of the attenuator comprises a first tensile strength, and wherein a second section of the attenuator comprises a second tensile strength greater than the first tensile strength.

5. The parachute arrangement of claim 4, wherein the first section of the attenuator is located closer to a first end of the secondary length as compared to the second section of the attenuator, the first end of the secondary length located opposite an apex formed by a fold in the secondary length.

6. The parachute arrangement of claim 4, wherein the first section of the attenuator comprises a plurality of first stitches formed having a first pitch, and wherein the second section of the attenuator comprises a plurality of second stitches formed having a second pitch less than the first pitch.

7. The parachute arrangement of claim 4, wherein the first section of the attenuator comprises a plurality of first stitches and the second section of the attenuator comprises a plurality of second stitches, and wherein a pattern of the first stitches is different from a pattern of the second stitches.

8. The parachute arrangement of claim 4, wherein the first section of the attenuator comprises a plurality of first stitches formed by a first thread and the second section of the attenuator comprises a plurality of second stitches formed by a second thread, and wherein a tensile strength of the second thread is greater than a tensile strength of the first thread.

9. The parachute arrangement of claim 4, wherein the attenuator comprises an adhesive.

* * * * *